United States Patent
Wang et al.

(10) Patent No.: US 9,666,907 B2
(45) Date of Patent: May 30, 2017

(54) THERMAL MANAGEMENT FOR HIGH-CAPACITY LARGE FORMAT LI-ION BATTERIES

(71) Applicant: UT-Battelle, LLC, Oak Ridge, TN (US)

(72) Inventors: Hsin Wang, Knoxville, TN (US); Keith Douglas Kepler, Hayward, CA (US); Sreekanth Pannala, Knoxville, TN (US); Srikanth Allu, Knoxville, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 277 days.

(21) Appl. No.: 14/150,154

(22) Filed: Jan. 8, 2014

(65) Prior Publication Data

US 2015/0064511 A1    Mar. 5, 2015

Related U.S. Application Data

(60) Provisional application No. 61/873,123, filed on Sep. 3, 2013.

(51) Int. Cl.
| | |
|---|---|
| *H01M 10/50* | (2006.01) |
| *H01M 4/02* | (2006.01) |
| *H01M 4/13* | (2010.01) |
| *H01M 4/58* | (2010.01) |
| *H01M 2/02* | (2006.01) |
| *H01M 2/08* | (2006.01) |
| *H01M 10/058* | (2010.01) |

(Continued)

(52) U.S. Cl.
CPC ..... *H01M 10/058* (2013.01); *H01M 10/0525* (2013.01); *H01M 10/0583* (2013.01); *H01M 10/613* (2015.04); *H01M 10/647* (2015.04); *H01M 10/6554* (2015.04); *H01M 10/486* (2013.01); *Y02E 60/122* (2013.01); *Y10T 29/49108* (2015.01)

(58) Field of Classification Search
CPC .......... H01M 10/60; H01M 4/13; H01M 2/06
USPC .................................................. 429/211, 120
See application file for complete search history.

(56) References Cited

U.S. PATENT DOCUMENTS

| | | | |
|---|---|---|---|
| 5,385,793 A | 1/1995 | Tiedemann et al. | |
| 5,478,667 A * | 12/1995 | Shackle | H01M 4/70 429/120 |

(Continued)

OTHER PUBLICATIONS

Bandhauer, "Electrochemical-thermal modeling and microscale phase change for passive internal thermal management for lithium ion batteries", Georgia Institute of Technology, Thesis. (Dec. 2011). (313 pages).

*Primary Examiner* — Patrick Ryan
*Assistant Examiner* — Julian Anthony
(74) *Attorney, Agent, or Firm* — Fox Rothschild LLP

(57) ABSTRACT

A lithium ion battery includes a cathode in electrical and thermal connection with a cathode current collector. The cathode current collector has an electrode tab. A separator is provided. An anode is in electrical and thermal connection with an anode current collector. The anode current collector has an electrode tab. At least one of the cathode current collector and the anode current collector comprises a thermal tab for heat transfer with the at least one current collector. The thermal tab is separated from the electrode tab. A method of operating a battery is also disclosed.

9 Claims, 17 Drawing Sheets

(51) Int. Cl.
*H01M 10/0525* (2010.01)
*H01M 10/6554* (2014.01)
*H01M 10/613* (2014.01)
*H01M 10/0583* (2010.01)
*H01M 10/647* (2014.01)
*H01M 10/48* (2006.01)

(56) References Cited

U.S. PATENT DOCUMENTS

| | | | |
|---|---|---|---|
| 6,010,800 A * | 1/2000 | Stadnick | H01M 10/6553 |
| | | | 429/120 |
| 7,056,608 B2 | 6/2006 | Lloyd et al. | |
| 7,172,831 B2 * | 2/2007 | Jaura | H01M 10/63 |
| | | | 429/120 |
| 2004/0241540 A1 | 12/2004 | Tsutsumi et al. | |
| 2005/0048361 A1 * | 3/2005 | Wang | H01M 2/26 |
| | | | 429/130 |
| 2008/0280206 A1 | 11/2008 | Oukassi | |
| 2010/0285370 A1 | 11/2010 | Xia et al. | |
| 2010/0310919 A1 | 12/2010 | Villarreal | |
| 2011/0171521 A1 | 7/2011 | Sohn | |
| 2013/0045409 A1 | 2/2013 | Schroeter et al. | |
| 2013/0192807 A1 | 8/2013 | Dekeuster | |

\* cited by examiner

THERMAL MANAGEMENT FOR HIGH-CAPACITY LARGE FORMAT LI-ION BATTERIES

CROSS REFERENCE TO RELATED APPLICATION

This application is a non-provisional patent application, which claims priority to U.S. Provisional Patent Application No. 61/873,123, filed Sep. 3, 2013, the entire contents of which are incorporated herein by reference.

STATEMENT REGARDING FEDERALLY SPONSORED RESEARCH

This invention was made with government support under contract No. DE-AC05-00OR22725 awarded by the U.S. Department of Energy. The government has certain rights in this invention.

FIELD OF THE INVENTION

This invention relates generally to lithium ion batteries, and more particularly to thermal control of lithium ion batteries.

BACKGROUND OF THE INVENTION

Li-ion batteries are known to have significant heating during charging and discharging. At normal 1 C rate or lower, heating is not significant and no cooling is required. At higher C-rates, such as 5 C, 10 C and higher as demanded in automotive and other applications, the cell temperature will increase dramatically and additional cooling is required. In order to cool down the core temperature to keep the Li-ion cells within the optimum operating temperatures of 20-40° C., convective natural cooling, forced air cooling, and forced air or liquid cooling through conducting plates have been utilized.

All of these state-of-the-art cooling methods utilize the large surface areas of the flat (prismatic) battery design and try to cool the battery from the surface. However, the battery is built by multiple layers of cathode/separator/anode as a jelly-roll or in stacks. Heat conduction through these layers is the least preferred direction because of the thermal resistance between the layers and the low thermal conductivity of the separators, which are typically polymeric membranes. Although copper and aluminum are used as current collectors, the effective thermal conductivity through the layers is about 1-2 W/mK as the effective conductance is the series sum of the conductivities. Cooling from the flat surfaces is very ineffective and usually the middle layer temperature can keep increasing during high C-rate discharge. These conditions have limited current Li-ion battery designs to be large in surface area (similar to 11"×8.5" paper) and small in thickness (6-8 mm) and 4 C-5 C maximum discharge rate. However, if the thickness of the batteries could be increased without increasing the surface area, for example high capacity cells could be produced with only 50 cells for a battery of 24 kWh. This would reduce the cost of the overall battery pack because of easier battery management and significant reduction of the peripherals related to connections and system complexity. In addition, more compact packing of the cells would be possible, thus increasing overall energy density of the battery pack.

SUMMARY OF THE INVENTION

A lithium ion battery includes a cathode in electrical and thermal connection with a cathode current collector. The cathode current collector has an electrode tab. A separator is provided. An anode is in electrical and thermal connection with an anode current collector. The anode current collector has an electrode tab. At least one of the cathode current collector and the anode current collector comprises a thermal tab for heat transfer with the at least one current collector. The thermal tab is separated from the electrode tab. A method of operating a battery is also disclosed.

The thermal tab can be on one side of the current collector. The thermal tab can be on two sides of the current collector.

The lithium ion battery can have a heat transfer system for heat transfer with the thermal tab. The heat transfer system can include a closed heat transfer channel for a heat transfer fluid.

A processor can be provided for controlling the flow rate of heat transfer fluid through the heat transfer channel. The processor can control at least one selected from the group consisting of a control valve and a variable rate pump.

The battery can have a sealed pouch. The anode and cathode can be sealed within the pouch. The electrode tabs can extend out of the sealed pouch. The thermal tabs can be sealed within the pouch. The heat transfer system can extend into the sealed pouch to transfer heat with the thermal tabs. The heat transfer system can transfer heat through a portion of the pouch adjacent to the thermal tabs. The heat transfer system can include a clamp for clamping the heat transfer system to the portion of the pouch adjacent to the thermal tabs. A portion of the thermal tabs can extend out of the sealed pouch. The heat transfer system can be in thermal communication with the portion of the thermal tabs extending out of the sealed pouch.

The heat transfer system can include at least one heat transfer channel in thermal contact with the portion of the pouch adjacent to the heat transfer tabs. The separator can be a Z-folding separator. The current collector and the thermal tabs can have a combined surface area between 10 and 15% larger than the surface area of the anode or the cathode. The thermal tab removes heat from the current collector.

A method of operating a battery includes the step of providing a cathode in electrical and thermal connection with a cathode current collector, the cathode current collector having an electrode tab; a separator, and an anode in electrical and thermal connection with an anode current collector, the anode current collector having an electrode tab. At least one of the cathode current collector and the anode current collector include a thermal tab separated from the electrode tab. A heat transfer system is provided for heat transfer with the thermal tab. The battery is operated while performing heat transfer with the thermal tab of at least one selected from the group consisting of an anode current collector and a cathode current collector.

The temperature of at least one selected from the group consisting of the anode current collector and the cathode current collector can be sensed. The heat transfer system can be controlled to conduct heat transfer with the thermal tab according to the sensed temperature. The heat transfer system can include at least one heat transfer channel and the control can be provided by controlling the flow of heat transfer fluid through the heat transfer channel.

The heat transfer system can maintain the battery temperature within a predetermined temperature range. The predetermined temperature range can be between 20 C and 40 C, or within 10 and 20% of the nominal operating temperature of the battery.

A method of making a battery includes the step of applying a cathode in electrical and thermal connection to a cathode current collector, the cathode current collector having an electrode tab. An anode is applied to be in electrical and thermal connection to an anode current collector. The anode current collector has an electrode tab. At least one of the cathode current collector and the anode current collector comprises a thermal tab separated from the electrode tab and is in thermal connection with the at least one current collector. The thermal tab is connected to a heat transfer system for heat transfer with the thermal tab.

BRIEF DESCRIPTION OF THE DRAWINGS

There are shown in the drawings embodiments that are presently preferred it being understood that the invention is not limited to the arrangements and instrumentalities shown, wherein.

DETAILED DESCRIPTION OF THE INVENTION

Figure 1:
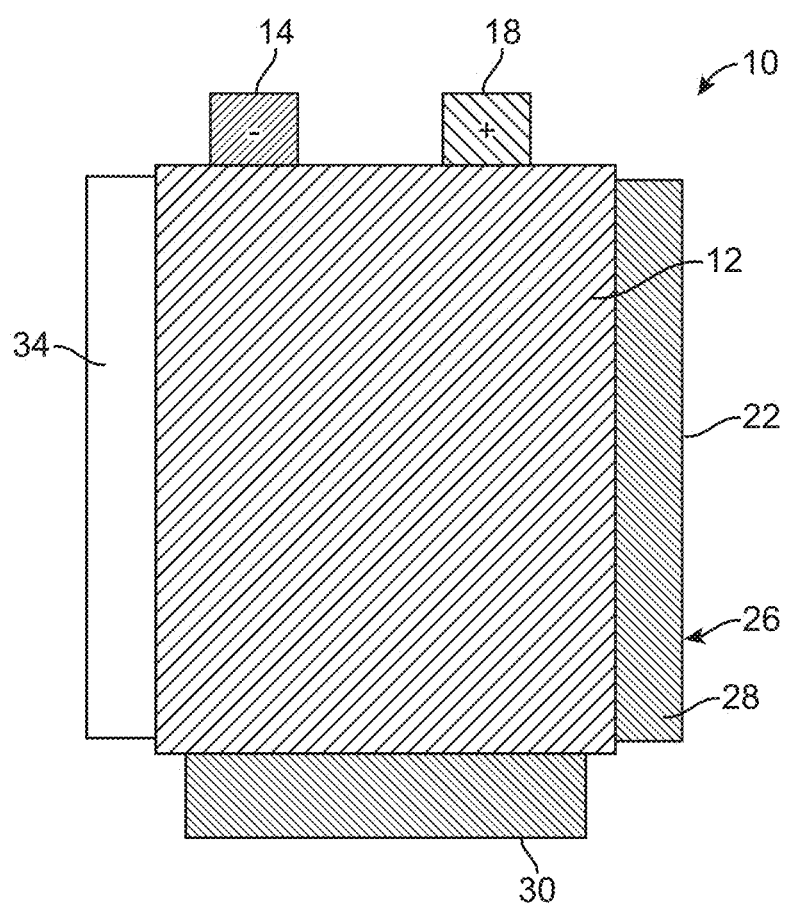
FIG. 1 is a schematic diagram of a first embodiment.

A lithium ion battery includes a cathode in electrical and thermal connection with a cathode current collector. The cathode current collector has an electrode tab. A separator is provided. An anode is in electrical and thermal connection with an anode current collector. The anode current collector has an electrode tab. At least one of the cathode current collector and the anode current collector comprises a thermal tab for heat transfer with at least one current collector. The thermal tab is separated from the electrode tab. A method of operating a battery is also disclosed.

The current collector can be made of suitable materials which are both electrically and thermally conductive. Copper and aluminum can be utilized, although other materials are possible. The thermal tab can be fashioned from the same material or a different material than the current collector. The thermal tab can be monolithic with the current collector or can be a separate item that is attached to the current collector so as to be thermally in communication with the current collector. The thermal tabs can be positioned in any number or position of current collectors in the battery, such as on every current collector in the battery, on alternating current collectors, on current collectors in the middle of the battery where thermal management problems are greatest, or in portions of the battery where thermal management is known to be an issue.

The lithium ion battery can have a heat transfer system for heat transfer with the thermal tab. The heat transfer system can include a closed heat transfer channel for a heat transfer fluid. The heat transfer channel can have any suitable geometry, including square and circular cross sections. The heat transfer channels are made of a conductive material which will transfer heat between the thermal tabs and the heat transfer fluid. One or more pumps can be provided to circulate the heat transfer fluid. Valves or other flow control devices can be provided to regulate the flow of heat transfer fluid through the channels. Although in many uses the heat transfer system will be a cooling system, the heat transfer system can also be a heating system. Batteries have optimal temperature of operation ranges, and in cold climates the temperature can fall below this optimal temperature range. Accordingly, in one embodiment the heat transfer system maintains the temperature of the cell within 10%-20% of the nominal operating temperature of the battery.

A processor can be provided for controlling the flow rate of heat transfer fluid through the heat transfer channel. The processor can control at least one selected from the group consisting of a control valve and a variable rate pump. A temperature sensor can be provided to sense the temperature of at least one of the current collector and the electrode, and to control the flow rate of heat transfer fluid based upon the sensed temperature. The flow rate of heat transfer fluid can also be controlled by the processor based upon sensed parameters of battery operation such as discharge rate.

The battery can have a sealed pouch. The anode and cathode can be sealed within the pouch. The electrode tabs can extend out of the sealed pouch. The thermal tabs can be sealed within the pouch. The heat transfer system can extend into the sealed pouch to transfer heat with the thermal tabs. The heat transfer system can transfer heat through a portion of the pouch adjacent to the thermal tabs. The heat transfer system can include a clamp for clamping the heat transfer system to the portion of the pouch adjacent to the thermal tabs. A portion of the thermal tabs can extend out of the sealed pouch. The heat transfer system can be in thermal communication with the portion of the thermal tabs extending out of the sealed pouch. In this case, electrical insulation between the thermal tabs connected to the cathodes and anodes is required to avoid shorting the battery.

The heat transfer system can include at least one heat transfer channel in thermal contact with the portion of the pouch adjacent to the heat transfer tabs.

The thermal tabs extend laterally outward from the current collector such that heat transfer with the exposed thermal tab portions is possible. Since most Li-ion batteries use copper and aluminum as current collectors, there is usually no need to attach the thermal tabs by joining methods. The current collector and thermal tabs are one continuous piece with two distinct functional areas. The current collector area can be defined as the overall area of the current collector in communication with or covered by the electrode material. The thermal tabs can be defined as uncoated areas with exposed metals. They are separate from the electrode tabs. Joining of the thermal tabs is not necessary giving the option of using thermal tabs in all or selected layer(s). It is also possible to make the selected layer(s) with thicker current collector and thermal tabs to enhance heat transfer. The thickness of the thermal tabs can be the same as the current collector or 2-5 times thicker. The thermal tabs can have an area that is at least 10-15% of the current collector area, up to 25%, 50%, or 100% of the current collector area. The dimensions of the thermal tabs will be limited by the size and weight requirements of the battery. The thermal tab removes heat from the current collector.

The invention can be utilized with a variety of different battery designs. In one such design, the separator can be a Z-folding separator. The invention has utility in many different battery types, including folded, stacked and rolled configurations. The invention has utility in lithium ion batteries, but also other types of batteries such as Li-Sulfur, Conversion, and Li-Air batteries.

A method of operating a battery includes the step of providing a cathode in electrical and thermal connection with a cathode current collector, the cathode current collector having an electrode tab; a separator, and an anode in electrical and thermal connection with an anode current collector, the anode current collector having an electrode tab. At least one of the cathode current collector and the anode current collector include a thermal tab separated from the electrode tab. A heat transfer system is provided for heat transfer with the thermal tab. The battery is operated while conducting heat transfer with the thermal tab of at least one selected from the group consisting of an anode current collector and a cathode current collector.

The temperature of at least one selected from the group consisting of the anode current collector and the cathode current collector can be sensed. The temperature of the heat transfer fluid at the inlet and/or the outlet of the heat transfer channels can be sensed. The heat transfer system can be controlled to conduct heat transfer with the thermal tab according to the sensed temperature. The heat transfer system can include at least one heat transfer channel and the control can be provided by controlling the flow of heat transfer fluid through the heat transfer channel.

The heat transfer system can maintain the battery temperature within a predetermined temperature range. The predetermined temperature range can be between 20 C and 40 C or 10-20% of nominal operating temperature.

There is shown in FIG. 1 a battery 10 having an electrode 12. The electrode 12 can be either an anode or cathode having an electrode tab 14 or 18, respectively. The electrode 12 can have an associated current collector 22. The current conductor 22 has a thermal tab portion 26 which extends laterally outward from the electrode 12 to provide a thermal tab 28 to the lateral side and a thermal tab 30 to the bottom. A thermal tab 34 can be provided in the case of an anode on an opposite side of a thermal tab for the cathode.

Figure 2:
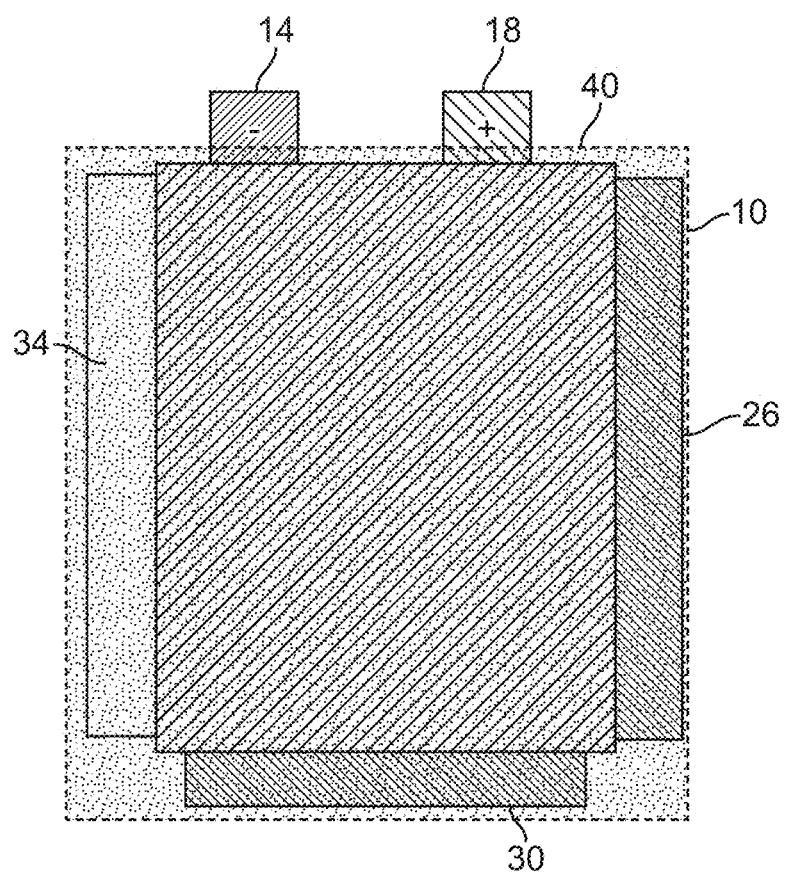
FIG. 2 is a schematic diagram of a second embodiment, partially in phantom.

There is shown in FIG. 2 an alternative embodiment in which the battery 10 is encased in a pouch 40. The pouch 40 is shown in the art and provided to seal the battery against escape of the battery constituents and gases, and to also prevent ingress of contaminants. The electrode tabs 14 and 18 can extend out of the sealed pouch 40 as shown. The thermal tabs 26, 30 and 34 are sealed within the pouch 40.

Figure 3:
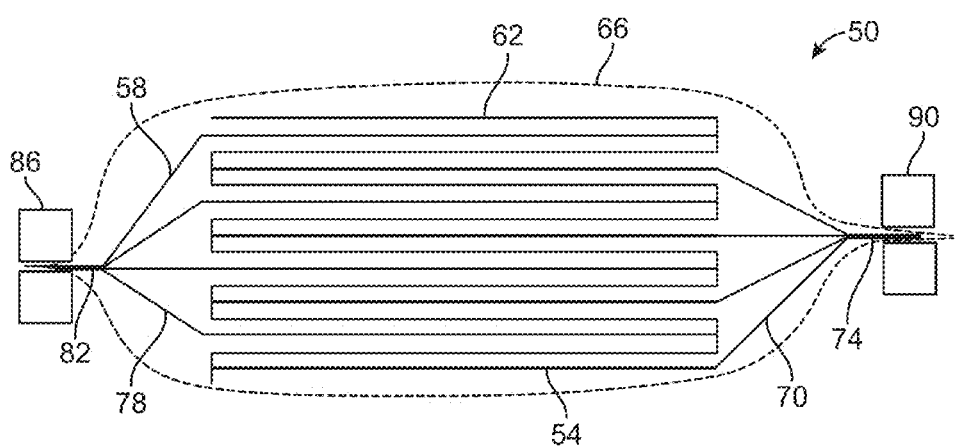
FIG. 3 is a schematic diagram of a third embodiment, partially in phantom.

There is shown in FIG. 3 an alternative embodiment of a battery 50 having anode current collector 54 and cathode current collector 58 and Z separator 62. The anode and cathode electrode layers have not been shown for simplicity and are denoted by the white space between the current collectors and separator. A pouch 66 seals the cell. The anode current collector 54 provides extended thermal tabs 70 which can come together at thermal junction 74. The cathode current collector 58 provides extended thermal tabs 78 which can come together at thermal junction 82. A heat transfer system including heat transfer channels 86 and 90 can be provided over each of the thermal junctions 74 and 82 and the associated pouch 66 to provide heat transfer with the thermal junctions and to the battery 50.

Figure 4:
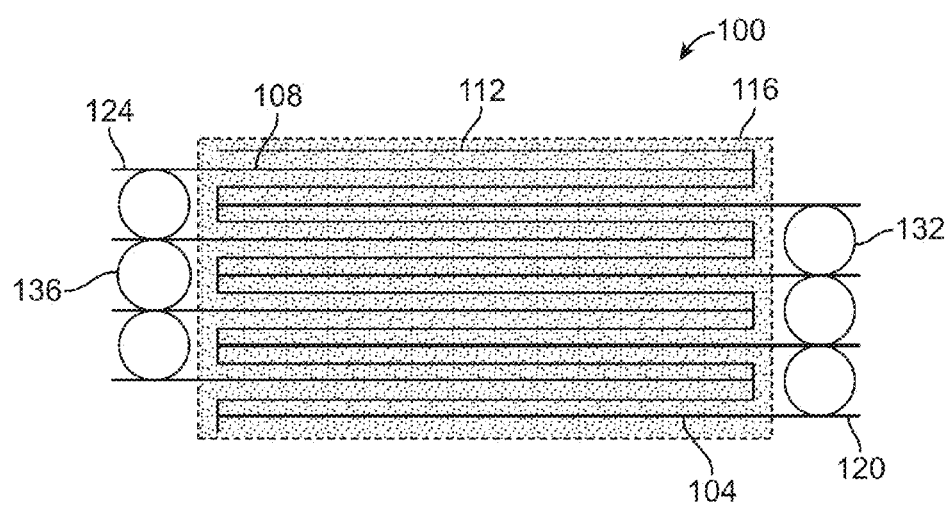
FIG. 4 is a schematic diagram of a fourth embodiment, partially in phantom.

A fourth embodiment of a battery 100 is shown in FIG. 4. The battery 100 includes anode current collector 104 and cathode current collector 108. A Z separator 112 is provided. The anode current collector 104, cathode current collector 108 and Z separator 112 can be enclosed within a sealed pouch 116. The anode current collector 104 has extended thermal tab portions 120 extending out of the sealed pouch 116. The cathode current collector 108 has extended thermal tab portions 124 extending out of the sealed pouch 116. A heat transfer system including heat transfer elements 132 can be provided in contact with the anode thermal tab portions 120. Heat transfer elements 136 can be provided in contact with the cathode thermal tab portions 124. The heat transfer elements 132 and 136 can be channels for a heat transfer fluid.

Figure 5:
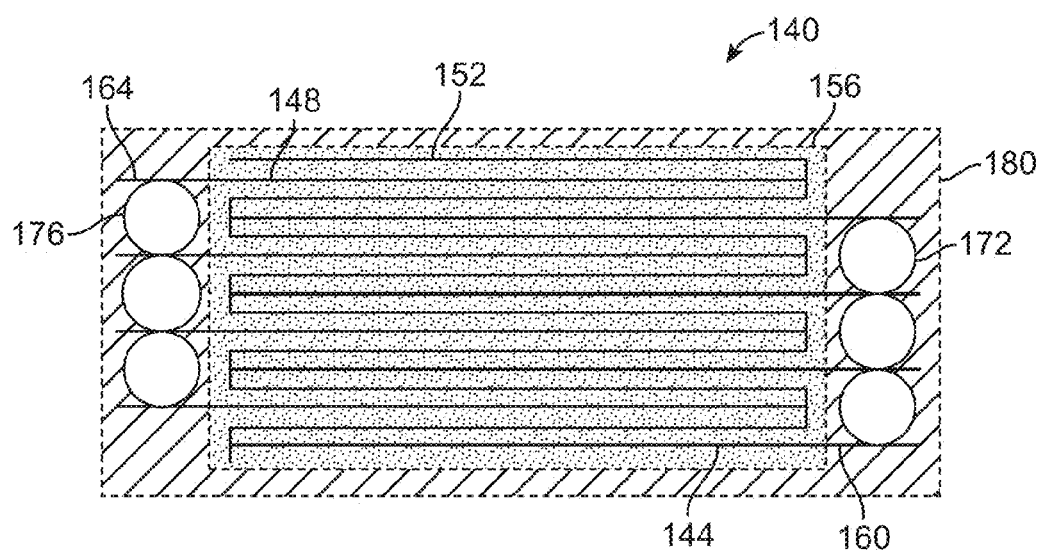
FIG. 5 is a schematic diagram of a fifth embodiment, partially in phantom.

There is shown in FIG. 5 a fifth embodiment of a battery 140. The battery 140 includes anode current collector 144 and cathode current collector 148. A Z separator 152 is provided. The anode and cathode electrodes have not been shown for simplicity. The anode current collector 144, cathode current collector 148 and Z separator 152 can be enclosed within a sealed pouch 156. The anode current collector 144 has extended thermal tab portions 160 extending out of the sealed pouch 156. The cathode current collector 148 has extended thermal tab portions 164 extending out of the sealed pouch 156. A heat transfer system including heat transfer elements 172 can be provided in contact with the anode thermal tab portions 160. Heat transfer elements 176 can be provided in contact with the cathode thermal tab portions 164. The heat transfer elements 172 and 176 can be channels for a heat transfer fluid. The cell can be enclosed by an outer sealed pouch 180.

Figure 6:
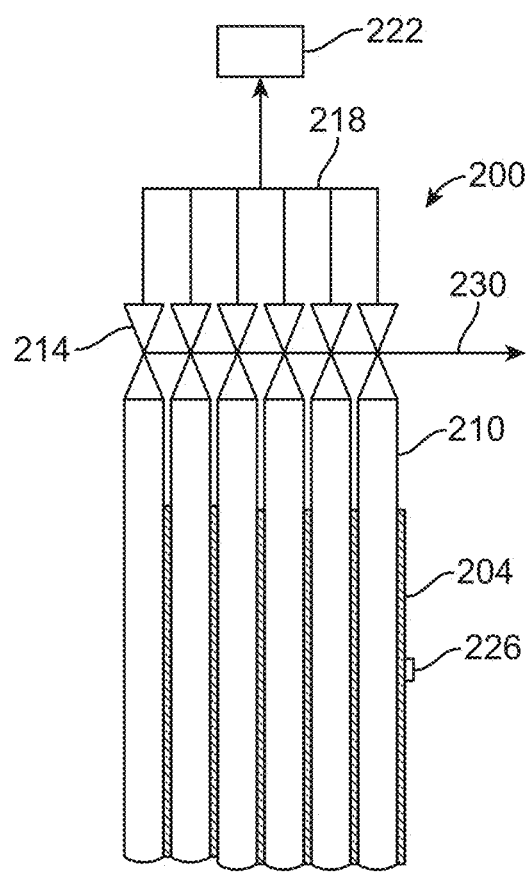
FIG. 6 is a schematic diagram of a sixth embodiment, partially in phantom.

Another embodiment of a battery 200 is shown in FIG. 6. The battery 200 includes current collectors 204 and heat transfer elements 210. Control elements such as valves 214 are provided to control the flow of heat transfer fluid through the heat transfer elements 210. Process control lines 218 can be provided to a processor 222 to control the valves 214 and the amount of heat transfer in the heat transfer elements 210. Temperature sensors 226 can be provided to provide a sensing of temperature to the processor 222. An actuator line 230 can be provided to actuate the movement of the valves 214 according to the process control signals 218 from the processor 222.

Figure 7:
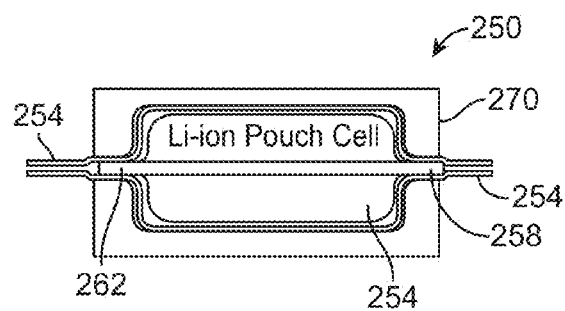
FIG. 7 is a schematic diagram of a seventh embodiment.

There is shown in FIG. 7 a battery 250 according to another embodiment of the invention. The battery 250 has a sealing pouch 254 and thermal tabs 258 and 262 of current collectors. The current collector thermal tabs 258 and 262 are in thermal contact with the pouch 254. A heat transfer system comprising a heat sink 270 is provided and contacts at least the portions of the pouch 254 adjacent to the thermal tabs 258 and 262.

Figure 8:
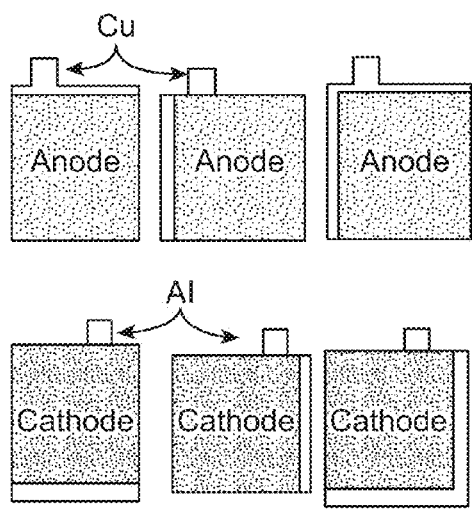
FIG. 8 is a schematic diagram of alternative collector/electrode geometries.

The thermal tab can be on one side of the current collector. The thermal tab can be on two sides of the current collector. There is shown in FIG. 8 an alternative embodiment of geometries of thermal tabs according to the invention. To the left are shown thermal tabs extending from the top and bottom respectively of an anode and cathode. In the middle drawing the thermal tabs are extending from opposing lateral sides of the anode and the cathode, respectively. The right drawing illustrates a two-sided extended thermal tab extending from the top and left-hand side for the anode, and the bottom and right inside for the cathode (bottom). The provision of the thermal tabs on opposite sides of the anode and cathode prevents these thermal tabs from touching and in this manner electrical short short-circuits are avoided. Also, the geometry of the current collector can include length to width ratios that are selected such that the side bearing the thermal tab is greater in dimension than the side or sides without the thermal tabs. In this manner the heat will have a shorter path to the thermal tabs from the center of the current collector for a given current collector surface area.

Figure 9:
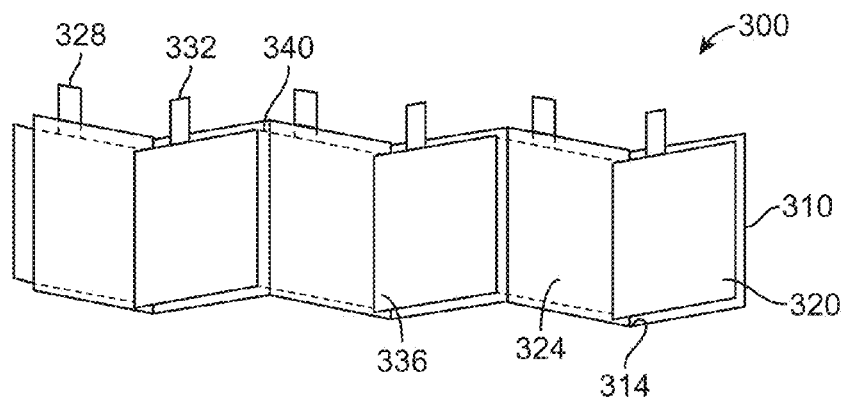
FIG. 9 is a schematic diagram of a method of manufacturing a battery.

There is shown in FIG. 9 a method illustrating the construction of the battery 300. A Z separator 310 is provided having a plurality of fold lines 314 which are folded in known manner to form the electrodes of a folded battery. Alternating anode current collectors 320 and cathode current collectors 324 have anode and cathode electrodes layered on to the separator 310. Electrode tabs 328 and 332 are provided in communication with the current collectors 320 and 324. The current collector material has extended thermal tab portions 336 and 340 which extend laterally outward past the fold lines 314. When the separator 310 is folded into position, the thermal tabs 336 and 340 extend outward on opposite sides where they can be connected to the thermal heat transfer system.

Figure 10:
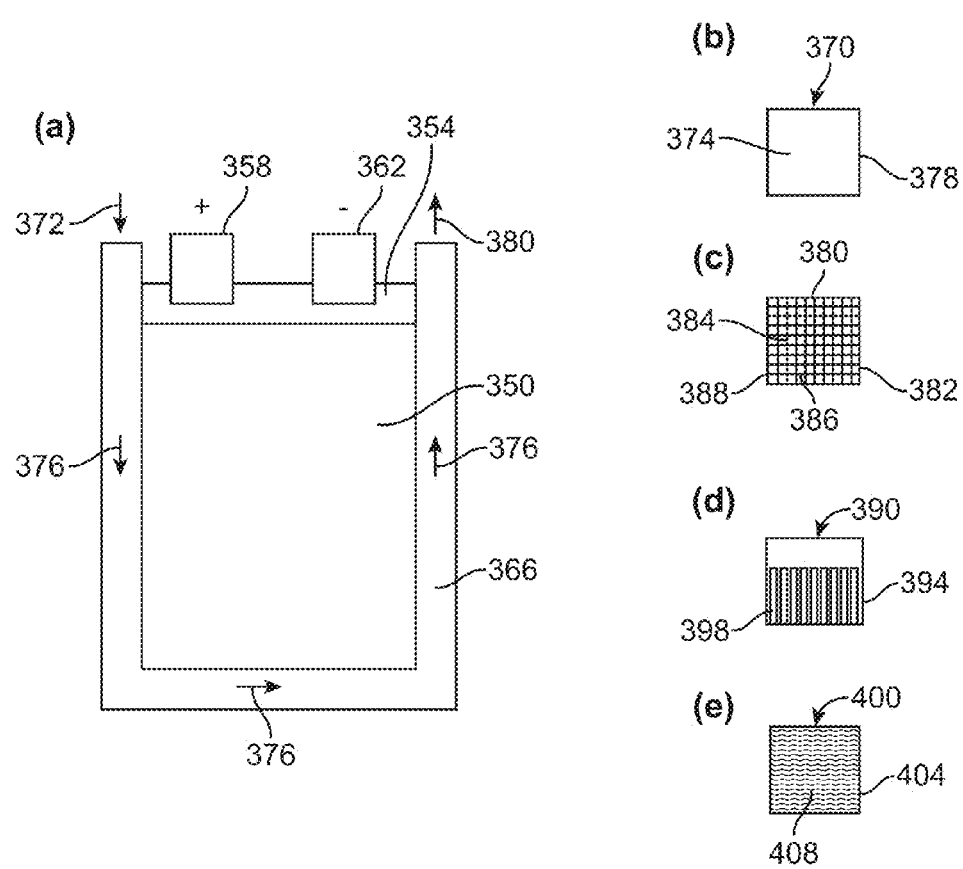
FIG. 10 is (a) a schematic diagram of an electrode having an integral cooling channel and (b)-(e) schematic cross-sections of alternative cooling channel designs.

FIG. 10 is (a) a schematic diagram of an electrode having an integral cooling channel and (b)-(e) schematic cross-section of alternative cooling channel designs. The electrode 350 can have an associated current collector 354. A positive terminal 358 or negative terminal 362 can be electrically connected to the current collector 354 for a cathode or anode construction. A side cooling channel 366 can be in thermal connection with the current collector 354 and thereby the electrode 350. A cooling fluid can enter the side cooling channel 366 according to arrows 372 and traverses the cooling channel as indicated by arrows 376 until exiting the cooling channel as indicated by arrows 380. The design in FIG. 10 (a) depicts a cooling channel flowing about three sides of the periphery of the electrode 350, however, other cooling channel geometries, flow paths and designs are possible.

The cooling channel 366 can have a variety of configurations, and can include supplemental heat transfer structures within the cooling channel for increasing the thermal contact of the cooling fluid flowing within the cooling channel with the walls of the cooling channel, and thereby with the thermal tabs and the current collector. The configuration shown in FIG. 10 (b) provides a cooling channel 370 with an open interior 374 surrounded by rectangular cooling channel walls 378. The configuration shown in FIG. 10 (c) provides a cooling channel 380 with exterior walls 382 and a plurality of crisscrossing interior walls 384, 386 forming interior mini-channels 388 for increasing the thermal contact with the cooling fluid. The configuration shown in FIG. 10 (d) provides a cooling channel 390 with exterior walls 394 and a plurality of spaced interior cooling fins 398 for increasing the thermal contact with the cooling fluid. The configuration shown in FIG. 10 (e) provides a cooling channel 400 with exterior walls 404 and a plurality of interior corrugation walls 408 to form corrugated channels for increasing thermal contact with the cooling fluid. Other configurations are possible for increasing the thermal contact with the cooling fluid.

Figure 11:
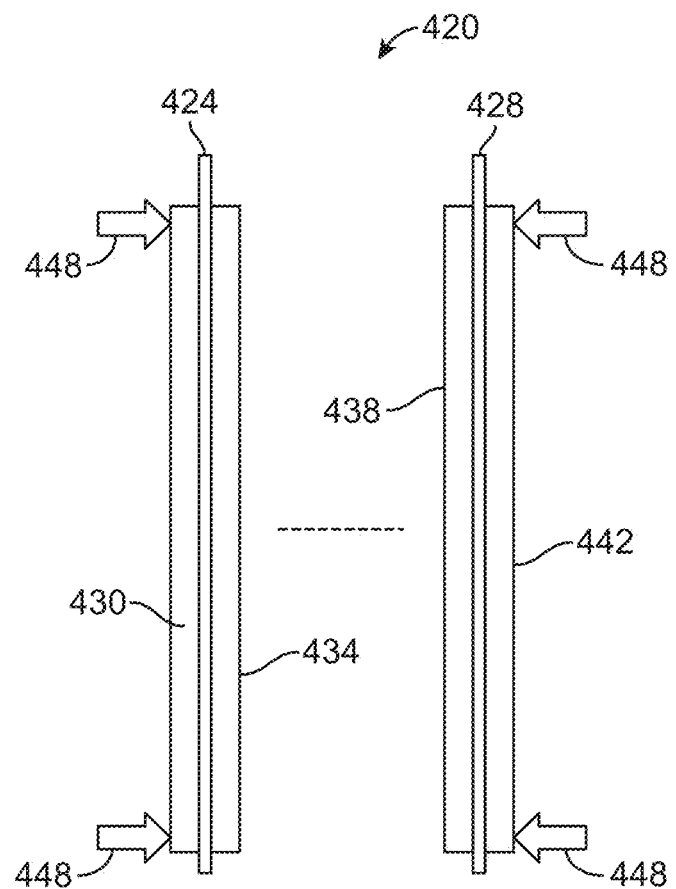
FIG. 11 is an exploded schematic diagram of multiple electrodes according to the invention with clamping.

FIG. 11 is an exploded schematic diagram of multiple electrodes according to the invention with clamping. The battery 420 can have any number of electrodes such as the electrodes 424 and 428. The electrode 424 has cooling channels 430, 434 associated therewith and in thermal contact with the thermal tab portions. The electrode 428 has cooling channels 438, 442 associated therewith and in thermal contact with the thermal tab portions. The cooling channels 430, 434 and 438, 442 utilize a cooling fluid flowing there through to transport heat away from the associated electrode 424 and 428. Cooling channels can be associated with all of the electrodes in a battery or only some portion of the electrodes. In a battery stack of 41 cathode electrodes effective cooling was provided with only 4 layers having active cooling according to the invention. The same number is effective for the anode electrodes.

Clamping as is known in the art can be provided to secure the battery cells together. Such clamping is indicated schematically by arrows 448. The purpose is to keep the cooling channels under compression in order to have good thermal contacts with the thermal tabs to ensure efficient heat transfer. Clamping depends on the number of cells in the module and the module design. Any clamping structure that ensures heat transfer between the cooling channels and the cells is possible.

Figure 12:
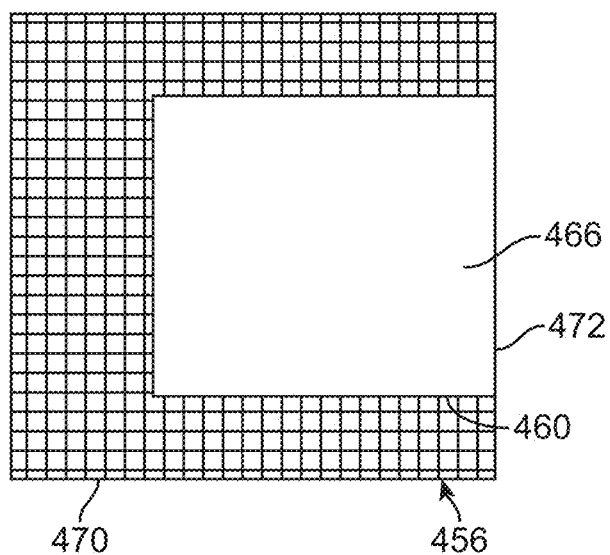
FIG. 12 is a schematic cross-section of a cooling channel design with a protective and/or insulating covering.

FIG. 12 is a schematic cross-section of a cooling channel design with a protective and/or insulating covering. The cooling channel 456 has cooling channel walls 460 defining an interior cooling channel flow space 466. The interior flow space 466 can be supplemented with structure such as cooling fins and mini-channels to enhance heat transport with the flowing fluid. An insulating and protective encasement material 470 such as plastic is provided to shield the cooling channel on all sides except the side 472 in thermal contact with the electrode.

Figure 13A:
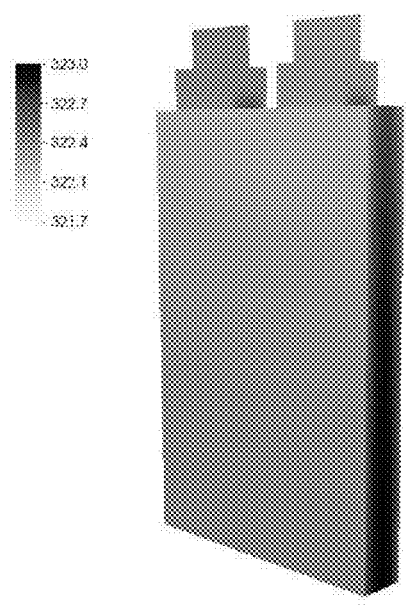
FIG. 13 (a)-(b) is a depiction of predicted cooling of an electrode using (a) convective cooling and (b) constant temperature cooling, using different temperature scales.
Figure 13B:
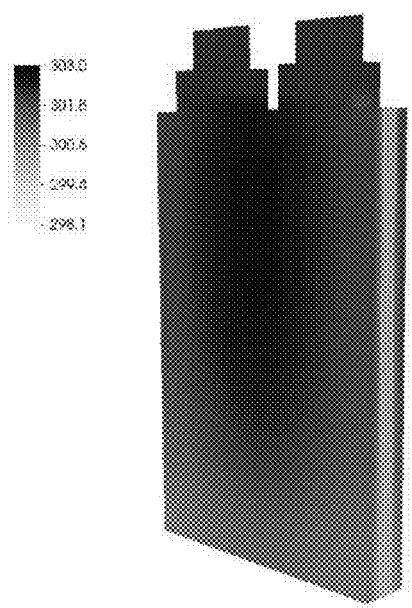
Figure 14A:
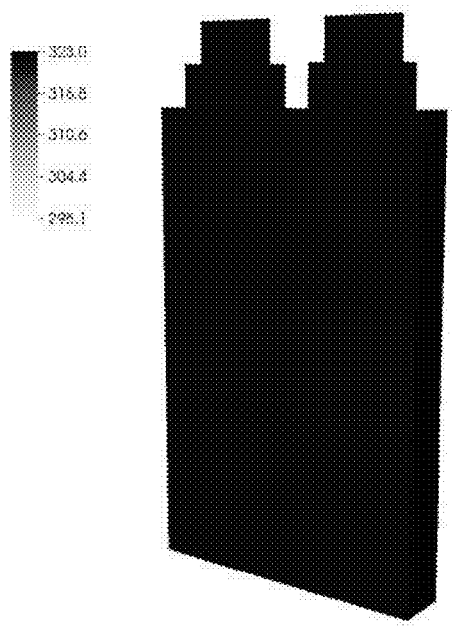
FIG. 14 (a)-(b) is a depiction of predicted cooling of an electrode using (a) convective cooling and (b) constant temperature cooling, using the same temperature scale.
Figure 14B:
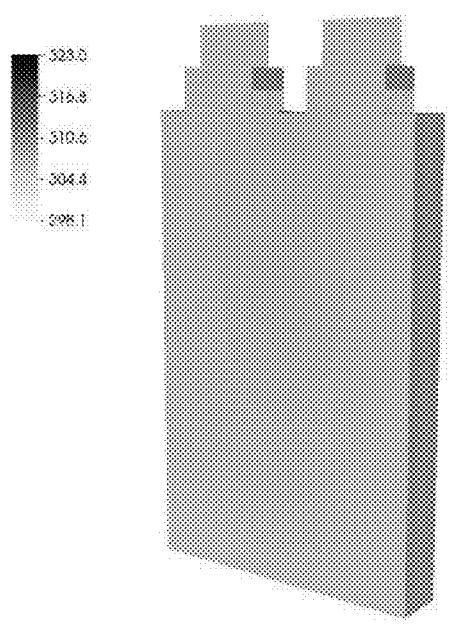

FIG. 13 (a)-(b) is a depiction of predicted cooling of an electrode using (a) convective cooling and (b) constant temperature cooling, using different temperature scales. The effectiveness of the constant temperature cooling is evident with temperatures almost 20° C. less with constant temperature cooling. FIG. 14 (a)-(b) is a depiction of predicted cooling of an electrode using (a) convective cooling and (b) constant temperature cooling, using the same temperature scale. The effectiveness of constant temperature cooling is particularly evident when viewed with the same temperature scale.

Figure 15:
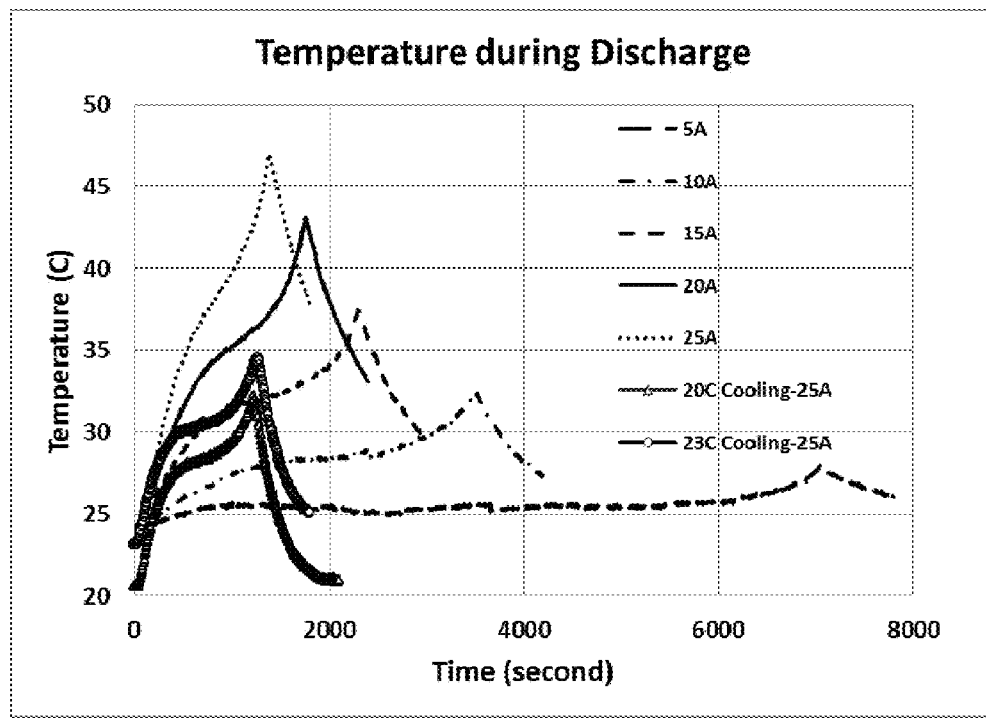
FIG. 15 is a plot of electrode temperature during discharge versus time for side cooling and no cooling conditions.

FIG. 15 is a plot of electrode temperature during discharge versus time for side cooling and no cooling conditions. A significant impact of cooling is clearly visible at 25 A, where temperatures below 35° C. were maintained with both 20° C. cooling fluid and also with 23° C. cooling fluid.

Figure 16:
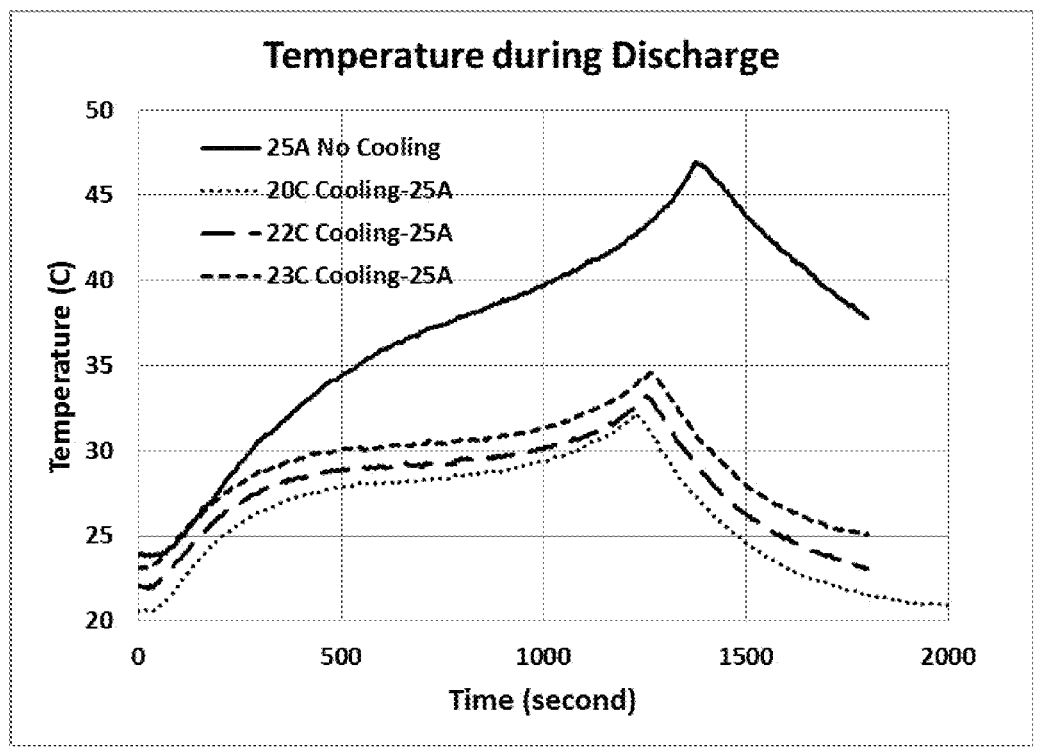
FIG. 16 is a plot of electrode temperature during discharge versus time for no cooling and cooling at various cooling fluid temperatures.

FIG. 16 is a plot of electrode temperature during discharge versus time for no cooling and cooling at various cooling fluid temperatures. The impact of cooling is evident, as is the sensitivity of the process to cooling fluid temperature.

Figure 17:
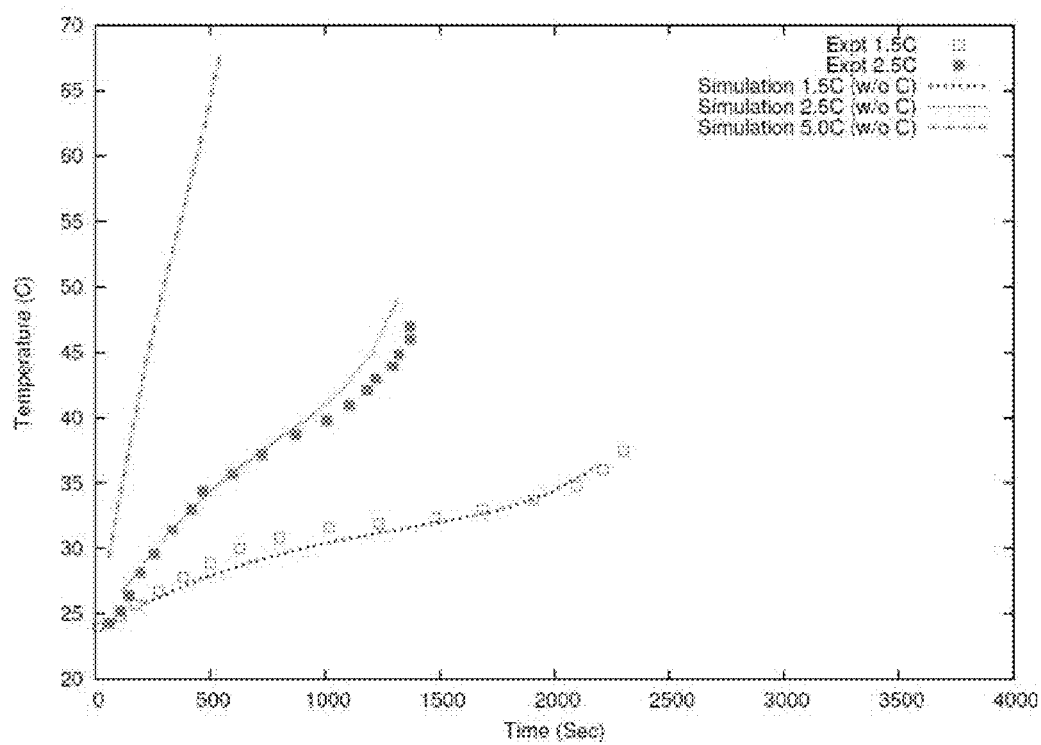
FIG. 17 is a plot of predicted and experimental electrode temperature during discharge versus time at different discharge rates.

FIG. 17 is a plot of predicted and experimental electrode temperature during discharge versus time at different discharge rates. These results indicate that with proper thermal contacts it is possible to have operating electrode temperatures under 30° C.

Figure 18:
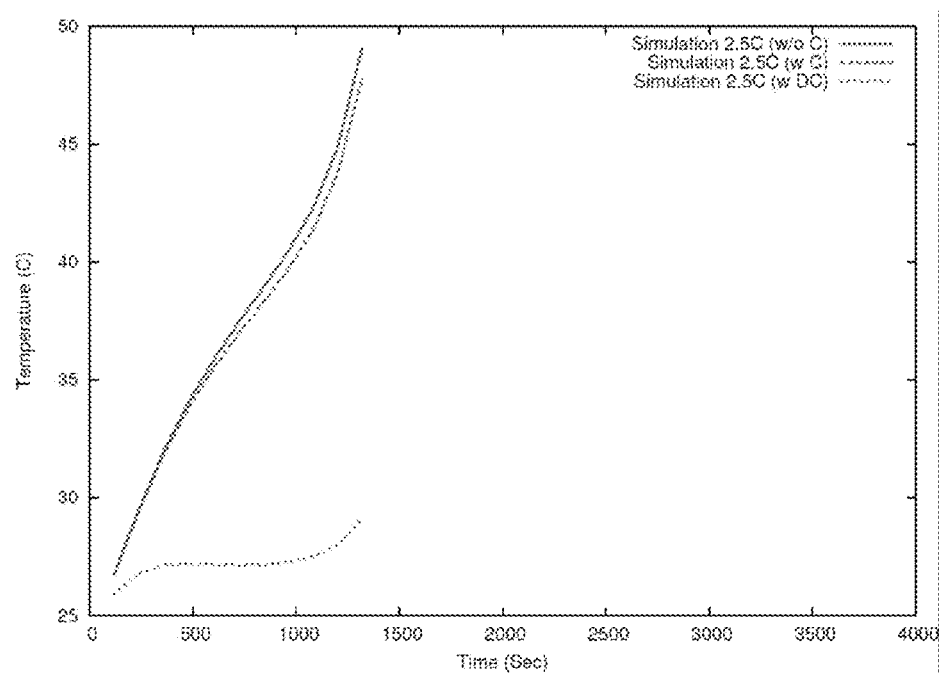
FIG. 18 is a plot of electrode temperature during discharge versus time for different cooling strategies.

FIG. 18 is a plot of electrode temperature during discharge versus time for different cooling strategies, including with and without convection, and with active cooling according to the invention. The cooling of the invention has a very significant impact and attains operating (2.5 C) temperatures below 30° C.

Figure 19:
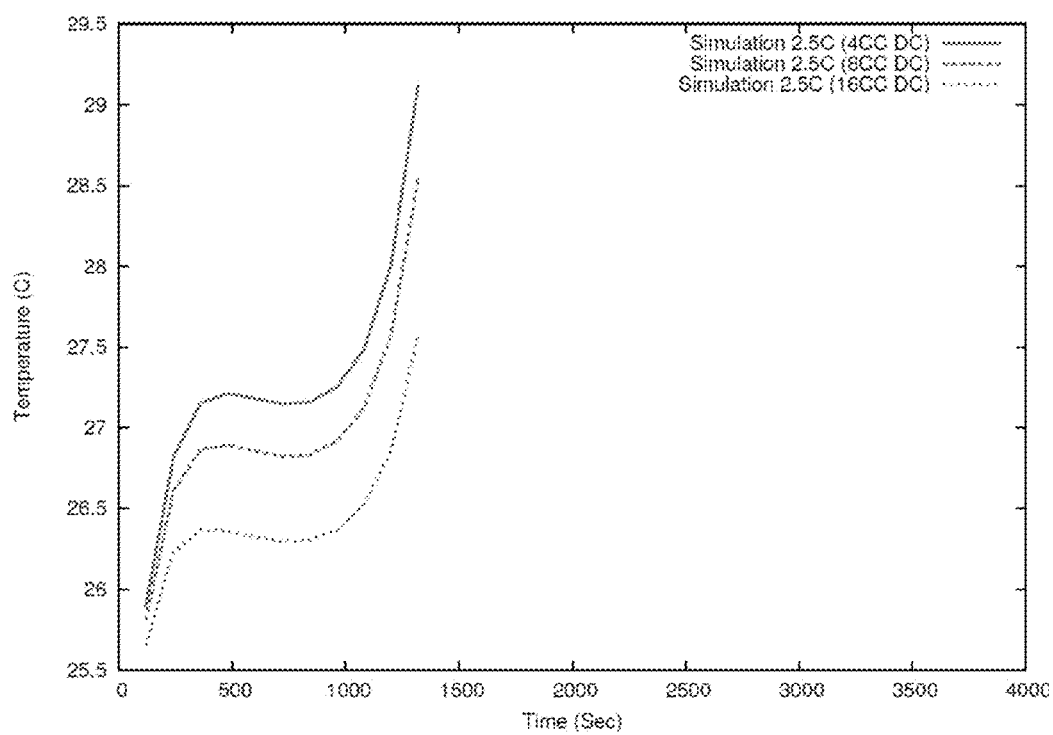
FIG. 19 is a plot of predicted electrode temperature during discharge with time for different numbers of layers with side thermal tabs according to the invention.

FIG. 19 is a plot of predicted electrode temperature during discharge with time for different numbers of layers with side thermal tabs according to the invention. At 2.5 C an increase in the number of layers provides an incremental benefit to lowering operating temperatures performance. The lowering of the temperature gradient by the use of for example 8 cooling layers decreases the heat transfer available with added, in the example 16, cooling layers.

Ranges: throughout this disclosure, various aspects of the invention can be presented in a range format. It should be understood that the description in the range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range for example, 1, 2, 2.7, 3, 4, 5, 5.3 and 6. This applies regardless of the bread of the range.

This invention can be embodied in other forms without departing from the spirit or essential attributes thereof, and accordingly, reference should be to the following claims to determine the scope of the invention.

We claim:

1. A lithium ion battery, comprising:
a cathode in electrical and thermal connection with a cathode current collector, the cathode current collector having an electrode tab;
a separator;
an anode in electrical and thermal connection with an anode current collector, the anode current collector having an electrode tab;
wherein at least one of the cathode current collector and the anode current collector comprises a thermal tab for heat transfer with the at least one current collector and other portions, the thermal tab being electrically connected to the other portions of the current collector and separated on the current collector from the electrode tab, and wherein at least one of the cathode current collector and the anode current collector comprises at least two sides, and the thermal tab is on two sides of the current collector.

2. A lithium ion battery, comprising:
a cathode in electrical and thermal connection with a cathode current collector, the cathode current collector having an electrode tab;
a separator;
an anode in electrical and thermal connection with an anode current collector, the anode current collector having an electrode tab;
wherein at least one of the cathode current collector and the anode current collector comprises a thermal tab for heat transfer with the at least one current collector, the thermal tab being separated from the electrode tab, further comprising a heat transfer system for heat transfer with the thermal tab, wherein the battery comprises a sealed pouch, the anode and cathode being sealed within the pouch, and wherein the thermal tabs are sealed within the pouch.

3. The lithium ion battery of claim 2, wherein the heat transfer system extends into the sealed pouch to transfer heat with the thermal tabs.

4. The lithium ion battery of claim 2, wherein the heats transfer system transfers heat through a portion of the pouch adjacent to the thermal tabs.

5. The lithium ion battery of claim 4, wherein the heat transfer system comprises a clamp for clamping the heat transfer system to the portion of the pouch adjacent to the thermal tabs.

6. The lithium ion battery of claim 4, wherein the heat transfer system comprises at least one heat transfer channel in thermal contact with the portion of the pouch adjacent to the heat transfer tabs.

7. A lithium ion battery, comprising:
a cathode in electrical and thermal connection with a cathode current collector, the cathode current collector having an electrode tab;
a separator;
an anode in electrical and thermal connection with an anode current collector, the anode current collector having an electrode tab;
wherein at least one of the cathode current collector and the anode current collector comprises a thermal tab for heat transfer with the at least one current collector and other portions, the thermal tab being electrically connected to the other portions of the current collector and separated on the current collector from the electrode tab, and wherein a portion of the thermal tabs extends out of the sealed pouch.

8. The lithium ion battery of claim 7, wherein the heat transfer system is in thermal communication with the portion of the thermal tabs extending out of the sealed pouch.

9. A lithium ion battery, comprising:
a cathode in electrical and thermal connection with a cathode current collector, the cathode current collector having an electrode tab;
a separator;
an anode in electrical and thermal connection with an anode current collector, the anode current collector haying an electrode tab;
wherein at least one of the cathode current collector and the anode current collector comprises a thermal tab for heat transfer with the at least one current collector and other portions, the thermal tab being electrically connected to the other portions of the current collector and separated on the current collector from the electrode tab, and wherein the separator is a Z-folding separator.

* * * * *